United States Patent
Tidwell et al.

(10) Patent No.: US 10,326,683 B2
(45) Date of Patent: Jun. 18, 2019

(54) CLASS OF SERVICE PROBE

(71) Applicant: ADTRAN, INC., Huntsville, AL (US)

(72) Inventors: Brad Tidwell, Huntsville, AL (US); Sean M. Osborne, Richmond Hill, GA (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/584,656

(22) Filed: May 2, 2017

(65) Prior Publication Data
US 2018/0324076 A1  Nov. 8, 2018

(51) Int. Cl.
*H04L 12/26* (2006.01)
*H04L 12/24* (2006.01)

(52) U.S. Cl.
CPC .............. *H04L 43/12* (2013.01); *H04L 41/22* (2013.01); *H04L 43/0852* (2013.01); *H04L 43/106* (2013.01)

(58) Field of Classification Search
CPC ... H04L 1/20; H04L 41/5006; H04L 43/0858; H04L 43/0864; H04L 43/50; H04L 47/10; H04L 47/115; H04L 47/125; H04L 41/22; H04L 43/0852; H04L 43/12; H04L 43/106
USPC ....... 370/230, 235, 247, 248, 252, 241, 249; 709/224
See application file for complete search history.

(56) References Cited

U.S. PATENT DOCUMENTS

| | | | | |
|---|---|---|---|---|
| 5,918,177 A | * | 6/1999 | Corriveau | H04W 68/00 455/432.3 |
| 7,467,192 B1 | * | 12/2008 | Lemler | H04L 41/5006 709/224 |
| 2003/0115321 A1 | * | 6/2003 | Edmison | H04L 1/20 709/224 |
| 2008/0117829 A1 | * | 5/2008 | Nakano | H04L 43/0858 370/247 |
| 2013/0003548 A1 | * | 1/2013 | Sridhar | H04L 47/125 370/235 |
| 2018/0091411 A1 | * | 3/2018 | Padmanabhan | H04L 43/10 |

\* cited by examiner

*Primary Examiner* — Harun Chowdhury
(74) *Attorney, Agent, or Firm* — Fish & Richardson P.C.

(57) ABSTRACT

Methods, systems, and apparatus for generating a delay profile for different priority classifications. In one aspect, multiple latency probes are transmitted by a source node to a target network node. Each latency probe has a different priority code. A response to each of the transmitted latency probes is received by the source node from the target network node. Based on the received responses, a delay profile for the target network node is generated by the source node. The delay profile provides multiple network latency measurements for packets transmitted to the target network node with the different priority codes. A user interface of a display is updated to visually present at least a portion of the delay profile.

18 Claims, 4 Drawing Sheets

CLASS OF SERVICE PROBE

BACKGROUND

This specification relates to Ethernet performance measurements.

International Telecommunication Union (ITU) standard Y.1731 defines methods to determine performance measurement (e.g., frame delay) on Ethernet networks. IEEE 802.1q specifies class of service using a 3-bit priority code point (p-bits) for Ethernet networks.

SUMMARY

In general, one innovative aspect of the subject matter described in this specification can be embodied in methods for providing network performance per priority classification. One example computer-implemented method includes transmitting, to a target network node and by a source node, multiple latency probes each having a different priority code, receiving, from the target network node and by the source node, a response to each of the transmitted latency probes, generating, by the source node, a delay profile for the target network node based on the received responses, the delay profile providing multiple network latency measurements for packets transmitted to the target network node with the different priority codes, and updating a user interface of a display to visually present at least a portion of the delay profile.

Particular embodiments of the subject matter described in this specification can be implemented so as to realize one or more of the following advantages. For example, the methods, devices, and/or systems described in the present disclosure can use multiple latency probes (e.g., Y.1731 Delay Measurement Messages (DMMs)) to collect delay measurements of a network at different classes of service (COS). In doing so, network operators can be provided with a latency profile, between a source network node and a target network node, including delay measurements for different priority classifications (e.g., each of the 8 priority code point values). The latency profile can help the network operators identify whether traffic at a certain priority classification achieves a targeted quality of service. In addition, the target network node can store p-bits value of a received latency probe and p-bits value of a response to the latency probe in Type, Length, and Value (TLV) fields of a Delay Measurement Response (DMR). These two p-bits values in the DMR can help the network operators identify p-bits value manipulation between the source network node and the target network node. Intermediate network nodes along a path between the source network node and the target network node may be targeted to send subsequent latency probe(s). Response(s) to the subsequent latency probe(s) can facilitate isolation of where network problems (e.g., congestion for certain priority classification(s), p-bits value manipulation) occur between the source network node and the target network node.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
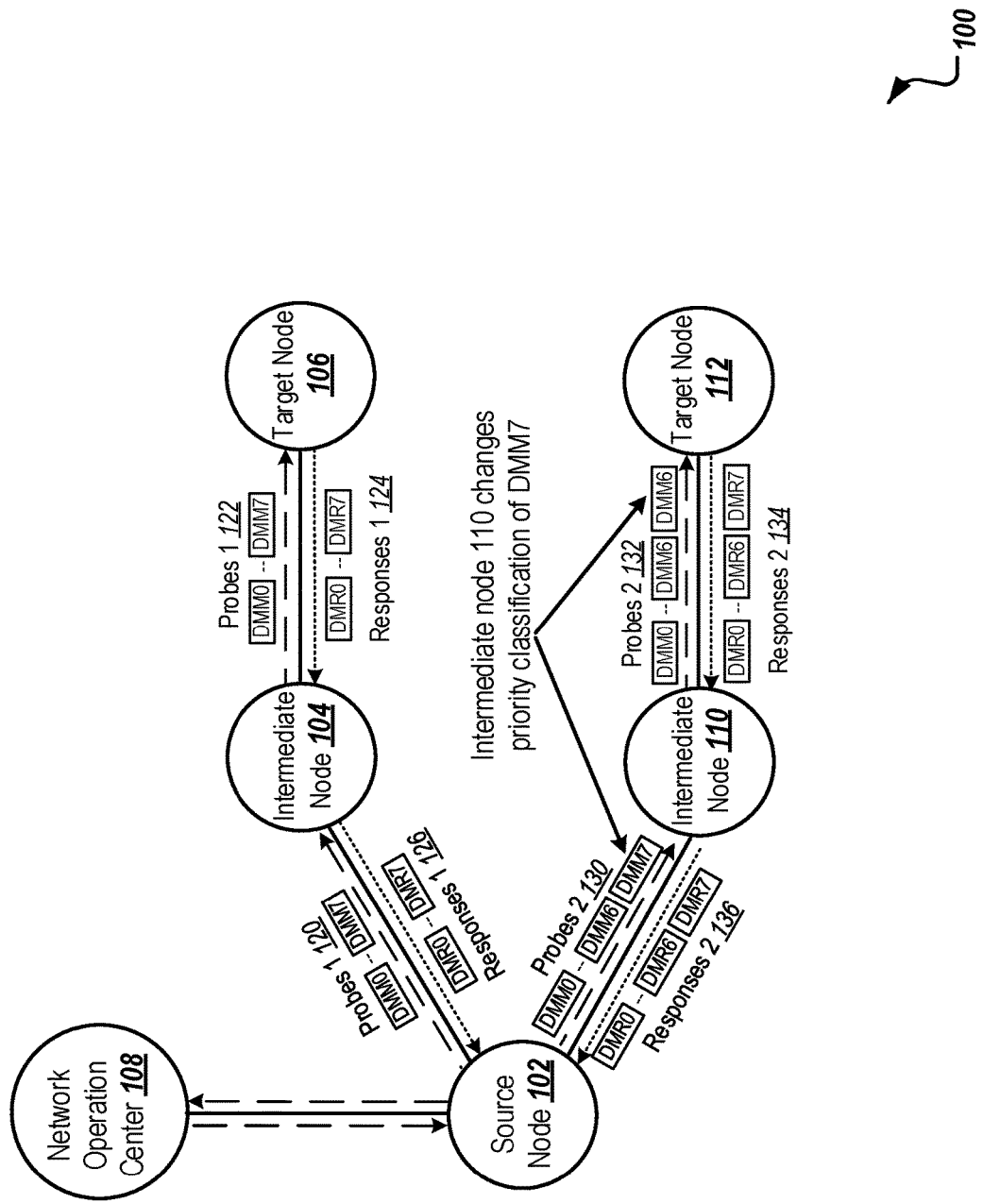
FIG. 1 is a block diagram illustrating an example networking environment for probing target network nodes at different priority classifications.

This document describes methods, systems, and apparatus for generating a delay profile for different priority classifications in a telecommunications network. For example, a source network node (e.g., a source node) can transmit multiple latency probes (e.g., Y.1731 Delay Measurement Messages (DMMs)), each having a different priority code (e.g., a 3-bit priority code point (p-bits) indicating a priority classification or a class of service (COS)), to a target network node. A network node can be, for example, a telecommunications device that includes processors and transmits data over the network. The source network node can receive a response (e.g., an Y.1731 Delay Measurement Response (DMR)) to each of the transmitted latency probes. The source network node can generate a delay profile providing multiple network latency measurements for packets transmitted to the target network node with the different priority codes. Although this disclosure refers to Ethernet performance measurements based on Y.1731 and priority classifications based on IEEE 802.1q for purposes of example, the subject matter of this document can be applied to other types of networks and/or other standards that measure network performance and provide priority classifications (e.g., layer three priority).

Network delay is a concern for latency sensitive data services. Network operators need to monitor delay measurements and diagnose delay problems in their networks in order to ensure that their customers receive targeted quality of service specified in a Service Level Agreement (SLA). Delay measurements in a network can be managed for various traffic types by prioritizing data flows based on a class of service (COS). For Ethernet networks, COS is indicated using the 3-bit priority code point (p-bits) specified in, for example, IEEE 802.1q. As a result, a delay profile providing delay measurements for various traffic types is desirable.

Many network switching elements ("switching elements") can change the priority code point of data traffic passing through those switching elements. If a switching element in a network is configured in such a manner, the network operators' management of COS may be compromised because it is difficult to detect priority code point changes and to determine which switching element is changing the priority code point.

The disclosed subject matter addresses problems that arise when latency sensitive data are prioritized and/or priority code point manipulation occurs in a network. In some implementations, multiple latency probes, each having a different priority code, are transmitted along a path from a source node to a target network node. The latency probes can be formed using a sequence of DMMs, for example, at each of the 8 priority code point values. Delay measurements for each priority code point value ("priority value") may be provided in response to the latency probes to indicate COS integrity on the path. Delay measurements for each priority value may help network operators detect/locate misconfigured network equipment and/or troubleshoot delay problems at certain priority classification(s). In addition, the target network node of a DMM can store received p-bits value of the DMM and p-bits value of a response to the DMM in the Type, Length, and Value (TLV) fields of a corresponding DMR. Upon receipt of the DMR, the source node can compare the received p-bits value to the sent p-bits value in order to detect p-bits value manipulation that is occurring along the path. If p-bits value manipulation along the path is detected, one or more intermediate network nodes along the path may be targeted to isolate where the p-bits value manipulation occurs in the path. The disclosed subject matter can be implemented using any one-way or two-way standard performance messages (e.g., Loopback Messages (LBMs), Continuity Check Messages (CCMs)) to determine, for example, p-bits value manipulation on the path.

FIG. 1 is a block diagram illustrating an example networking environment 100 for probing target network nodes at different priority classifications. As illustrated in FIG. 1, the environment 100 includes a source node 102 (e.g., a telecommunication device that initiates transmission of data), a target node 106 (e.g., a telecommunication device to which the data is addressed), an intermediate node 104 that is located on a communication path between the source node 102 and the target node 106, another target node 112, and another intermediate node 110 that is located on a communication path between the source node 102 and the target node 112. The environment 100 also includes a network operation center 108 that monitors, controls, and/or manages the source node 102 (or any other pieces of network equipment). In some implementations, the environment 100 may include additional and/or different components not shown in the block diagram, such as one or more intermediate nodes between the source node 102 and target nodes 106 and 112, another type of network that provides network services, or a combination of these and other technologies. In some implementations, components may also be omitted from the environment 100.

As illustrated, the source node 102 can communicate with the target nodes 106 and 112 through the intermediate nodes 104 and 110, respectively. The source node 102 can be a switching element or another layer two device that can craft an Ethernet frame. In some implementations, the source node 102 transmits multiple latency probes to, for example, the target node 106 to measure delay performance for various traffic types at various priority classifications. The latency probes can include latency probes for every priority classification. The latency probes can be transmitted periodically to monitor network performance between the source node 102 and the target node 106 over a period of time. The latency probes can be transmitted when instructed by network operation center 108. For example, the network operation center 108 can generate the latency probes according to a schedule. In some implementations, the network operation center 108 can access the schedule, determine that the current time matches a time at which the latency probes are to be transmitted, and send the latency probes. In some implementations the network operation center 108 can send the latency probes on demand, such as when an administrator interacts with a user interface element that initiates transmission of the latency probes.

When responses to the latency probes are received, the source node 102 can generate a delay profile for the path between the source node 102 and the target node 106 based on the received responses. The delay profile provides multiple network latency measurements for packets transmitted to the target node 106 with different priority codes. In some implementations, the source node 102 can store the received responses for further analysis. For example, the responses can be stored for trending analysis of network latency. The responses can also be used to indicate conformance or nonconformance to SLAs. When the source node 102 determines, based on the delay profile, that traffic with a certain priority classification is experiencing heavy delay (e.g., delay for packets having the certain priority classification is outside of an acceptable delay range or over threshold delay), the intermediate node 104 may be targeted to be transmitted a subsequent latency probe with the certain priority classification. When the p-bits value of a latency probe for a certain priority classification and the p-bits value of a response to the latency probe differ (e.g., as determined based on a comparison of the probe p-bits value and the response p-bits value), the source node 102 can determine that p-bits value manipulation is occurring at some point in the communication path between the source node 102 and the target node 106.

The intermediate nodes 104 and 110 are telecommunications devices that pass traffic that is addressed to (e.g., destined for) other nodes that differ from the intermediate nodes 104 and 110. For example, when intermediate node 104 receives traffic from source node 102 that is addressed to target node 106, the intermediate node 104 passes the received traffic to the target node 106. When traffic is destined to the intermediate nodes 104 and 110 (e.g., a subsequent latency probe targeting the intermediate node 104 or 110), the intermediate nodes 104 and 110 are then considered target nodes for the latency probe, and the intermediate nodes 104 and 110 can process the traffic in a manner similar to that described below with reference to the target nodes. In some implementations, the intermediate nodes 104 and 110 can modify a priority classification specified in the traffic. For example, the intermediate nodes 104 and 110 can change a p-bits value in Ethernet frames to another p-bits value to increase/decrease priority level of the Ethernet frames.

The target nodes 106 and 112 receive the latency probes destined to them and transmit responses to the latency probes to the source node 102. Each response corresponds to a particular latency probe and has a priority classification indicating a same traffic type as the particular latency probe. For example, if the particular latency probe that is transmitted to the target node 106 is a latency probe for a delay measurement at priority level 1 (e.g., Tx p-bits f value of the latency probe is set to 1), the corresponding response will also be at priority level 1 (e.g., the p-bits value of the response is set to 1). The target node 106 generates the corresponding response to include information that can be used to calculate delay performance for the priority classification. For example, a timestamp of when the particular latency probe egresses the source node 102 can be copied from the particular latency probe and stored in the corresponding response. In addition, a timestamp of when the particular latency probe ingresses the target node 106 can be stored in the corresponding response. Based on these two timestamps, the source node 102 can calculate a delay measurement from the source node 102 to the target node 106 for traffic at the priority classification. For example, the delay measurement can be computed as the mathematical difference between the timestamps.

As illustrated in FIG. 1, the source node 102 transmits multiple probes 120 to target node 106. The probes 120 includes 8 DMMs at 8 different priority classifications (e.g., DMM0 with p-bits value set to 0 to DMM7 with p-bits value set to 7). The probes 120 are transmitted sequentially one after another. In some implementations, the probes 120 can be transmitted in any order (e.g., DMM0-DMM7, DMM7-DMM0). Each DMM includes a timestamp of when the particular latency probe egresses the source node 102. When the intermediate node 104 receives the probes 120, the intermediate node 104 passes the probes 120 to the target node 106.

In some implementations, the order of the probes 120 may be changed (e.g., to probes 122) based on network configuration at the intermediate node 104. For example, probes with high priority classification may be transmitted before probes with low priority are transmitted. In some implementations, the probes 120 may travel through different paths between the source node 102 and the target node 106.

When the target node 106 receives the probes 120/122, the target node 106 can generate a response to each of the received latency probes (e.g., DMR0 to DMM0, DMR7 to DMM7). The target node 106 can store the timestamp of when the particular latency probe egresses the source node 102, copied from the corresponding DMM, in the corresponding DMR. In addition, the target node 106 can store a timestamp of when the particular latency probe ingresses the target node 106 and a timestamp of when the corresponding response egresses the target node 106 in the corresponding DMR. The generated responses 124/126 (e.g., DMR0-DMR7) are transmitted back to the source node 102 through intermediate node 104. When the response 126 ingresses the source node 102, a timestamp of when each response ingresses the source node 102 can be stored in a corresponding DMR. As a result, the source node 102 can calculate delay measurements (e.g., from source node 102 to target node 106, from target node 106 to source node 102) and/or process delay at the target node 106 for each priority classification. For example, a delay measurement from source node 102 to target node 106 can be computed as the mathematical difference between the timestamp of when the particular latency probe ingresses the target node 106 and the timestamp of when the particular latency probe egresses the source node 102. In some implementations, the source node 102 can generate a delay profile for path between the source node 102 and the target node 106 based on the received responses 126 and provide the delay profile to, for example, the network operation center 108. The delay profile provides multiple network latency measurements for packets transmitted to the target node 106 with different priority codes. For example, the delay profile can include network latency measurements for packets transmitted to the target node 106 at all priority levels (i.e., priority levels 0-7).

In some implementations, the source node 102 and/or the network operation center 108 can determine, based on the delay profile, that a delay measurement for packets having a given priority code and transmitted to the target node 106 is outside of an acceptable delay range. For example, using the delay profile, the source node 102 and/or operation center 108 may determine that traffic at priority level 0 experiences delay outside the acceptable delay range (e.g., based on a comparison of a delay measurement in the delay profile for priority level 0 traffic to a pre-specified or stored acceptable delay range for priority level 0 traffic). Similarly, the source node 102 and/or operation center 108 may determine that traffic at priority levels 1-7 experience delay that is within the acceptable delay range (e.g., based on a comparison of the delay measurements in the delay profile for priority levels 1-7 to a pre-specified or stored acceptable delay range for these priority levels). In order to identify which part of a communication path between the source node 102 and the target node 106 causes the delay problem for traffic at priority level 0, an intermediate node (e.g., intermediate node 104) can be targeted for a subsequent latency probe with the given priority code (discussed in more detail in FIG. 2 below).

As illustrated in FIG. 1, the source node 102 also transmits multiple probes 130 to target node 112. The probes 130 includes 8 DMMs at 8 different priority classifications (e.g., DMM0 with p-bits value set to 0 to DMM7 with p-bits value set to 7). The probes 130 are transmitted sequentially one after another. The target node 112 can store the p-bits value of a received probe in Type, Length, and Value (TLV) fields of the corresponding DMM. In some implementations, the probes 130 can be transmitted in any order (e.g., DMM0-DMM7, DMM7-DMM0). When the intermediate node 110 receives the probes 130, the intermediate node 110 passes the probes 130 to the target node 112.

In some implementations, the order of the probes 130 may be changed (e.g., to probes 132) based on network configuration at the intermediate node 110. For example, probes with high priority classification may be transmitted before probes with low priority are transmitted. In some implementations, the probes 130 may travel through different paths between the source node 102 and the target node 112.

When the target node 112 receives the probes 130/132, the target node 112 can generate a response to each of the received latency probes (e.g., DMR0 to DMM0, DMR7 to DMM7). The target node 112 can store the p-bits value of a received probe in Type, Length, and Value (TLV) fields of the corresponding DMR. In addition, the target node 112 can store p-bits value of the corresponding response to the probe in TLV fields of the corresponding DMR. The generated responses 134/136 (e.g., DMR0-DMR7) are transmitted back to the source node 102 through intermediate node 110. As a result, the source node 102 can determine whether p-bits value manipulation occurs between the source node 102 and the target node 112 based on a comparison of the two p-bits values in a given DMR. For example, intermediate node 110 changes priority level for DMM7 from priority level 7 to priority level 6 (e.g., DMM6). When the target node 112 receives the modified DMM6, the target node 112 generates a response based on traffic priority level (e.g., DMR7). The target node 112 stores received DMM6 priority level (i.e., level 6 in the TLV field Rx p-bits f) and generated DMR7 priority level (i.e., level 7) in the TLV field Tx p-bits b of the DMR7. Therefore, when the source node 102 receives the DMR7, the source node 102 can store the received priority in field Rx p-bits b and determine that p-bits value have been changed for priority level 7 traffic. In some implementations, since the intermediate node 110 changes priority level, for example, for DMM7 from priority level 7 to priority level 6 for the link connected to the target node 112, the intermediate node 110 may not admit frames with priority level 7 received from the target node 112. In such cases, when the target node 112 receives the modified DMM6, the target node 112 generates a response based on received DMM6 priority level (e.g., DMR6) instead of generating a response based on traffic priority level (e.g., DMR7). By generating the response based on the received DMM6 priority level (e.g., DMR6), the target node 112 can make sure that the response can pass through the intermediate node 110.

The network operation center 108 receives, from the source node 102, a delay profile providing delay measurements for various priority classifications between the source node 102 and a target node (e.g., target node 106). The network operation center 108 may provide the delay profile to network operators and/or customers who have subscribed to Ethernet service between the source node 102 and the target node (e.g., target node 106). In some implementations, the network operation center 108 receives Ethernet service queries from customers, and requests query results (e.g., the delay profile) from the source node 102 by instructing the source node 102 to send multiple latency probes. In some implementations, the network operators detect a problem (e.g., misconfigured network equipment) between the source node 102 and the target node (e.g., target node 106), and instruct the source node 102 to send multiple latency probes to troubleshoot the problem.

Figure 2:
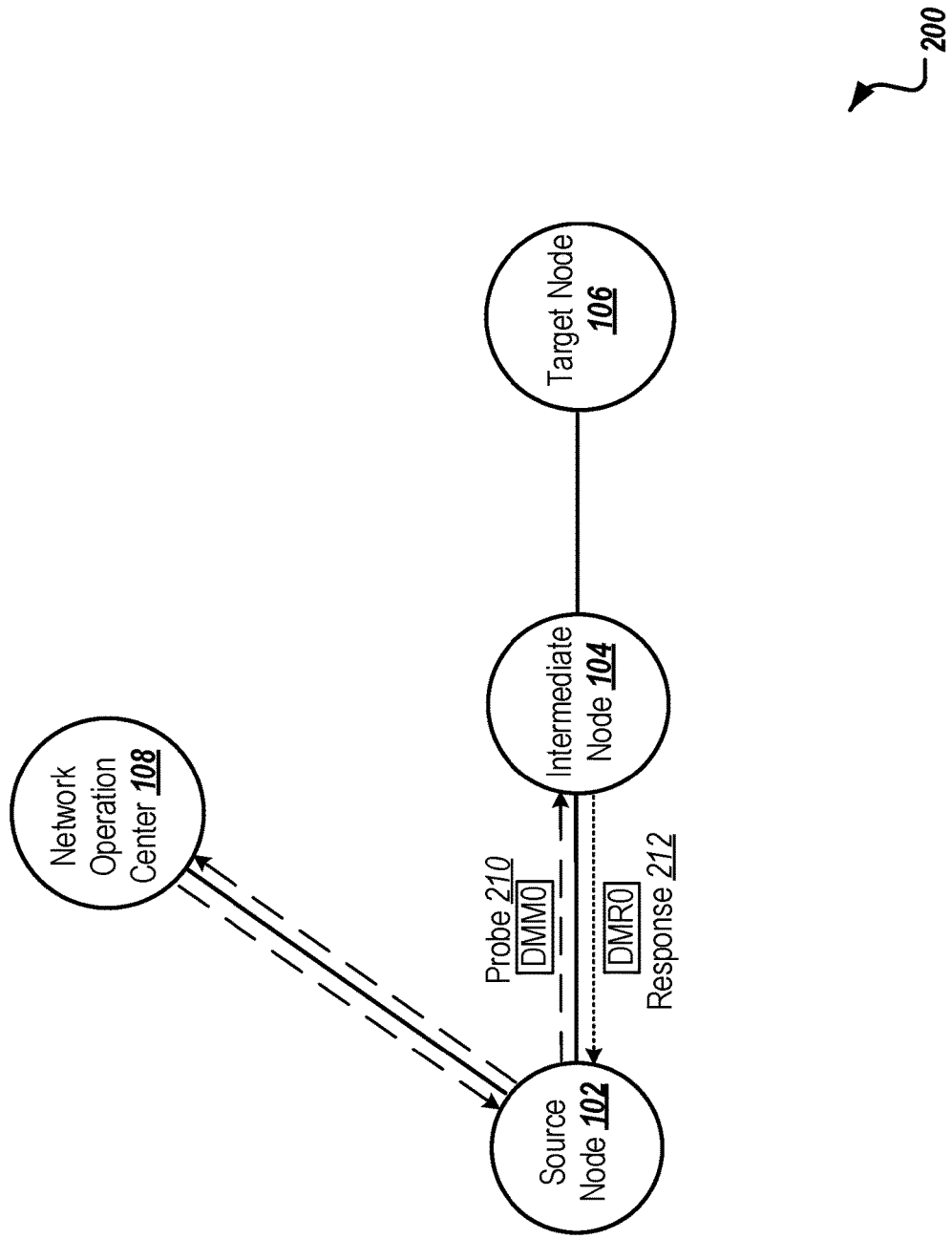
FIG. 2 is a block diagram illustrating an example networking environment for probing an intermediate network node at a specific priority classification.

FIG. 2 is a block diagram illustrating an example networking environment 200 for probing an intermediate network node at a specific priority classification. As illustrated in FIG. 2, the environment 200 includes a source node 102, a target node 106, and an intermediate node 104 that is located on a communication path between the source node 102 and the target node 106. The environment 200 also includes a network operation center 108 that monitors, controls, and/or manages the source node 102 (or any other network equipment). In some implementations, the environment 200 may include additional and/or different components not shown in the block diagram, such as one or more intermediate nodes between the source node 102 and target node 106, another type of network that provides network services, or a combination of these and other technologies. In some implementations, components may also be omitted from the environment 200.

As discussed in FIG. 1 above, the source node 102 transmits a subsequent probe 210 (e.g., DMM0) with the given priority code (i.e., priority code 0) to the intermediate node 104. When the intermediate node 104 receives the probe 210, the intermediate node 104 generates a response 212 and transmits the response 212 back to the source node 102. The intermediate node 104 generates the response 212 to include information that can be used to calculate delay performance for the given priority code. For example, a timestamp of when the subsequent probe 210 egresses the source node 102 can be copied from the subsequent probe 210 and stored in the response 212. In addition, a timestamp of when the subsequent probe 210 ingresses the intermediate node 104 can be stored in the response 212. Based on the response 212 to the subsequent probe 210, the source node 102 and/or the network operation center 108 can determine a delay measurement for packets transmitted to the intermediate node 104 with the given priority code (i.e., priority code 0). For example, the delay measurement can be computed as the mathematical difference between the two timestamps. If the delay measurement for packets transmitted to the intermediate node 104 with the given priority code contributes more than a threshold (e.g., 90%) to the delay measurement for packets transmitted to the target node 106 with the given priority code (e.g., comparing delay to the intermediate node 104 computed based on the response 212 and delay to the target node 106 computed before transmitting the subsequent probe 210), the delay problem for traffic at the given priority code lies between the source node 102 and the intermediate node 104. Otherwise, the delay problem lies between the intermediate node 104 and the target node 106. Additional intermediate node(s) may be targeted for additional subsequent probe(s) with the given priority code to locate the delay problem more precisely. For example, if the delay problem for traffic at the given priority code lies between the source node 102 and the intermediate node 104, an intermediate node between the source node 102 and the intermediate node 104 (not shown in FIG. 2) may be targeted for a subsequent probe with the given priority code. The subsequent probe can further determine where the delay problem lies between the source node 102 and the intermediate node 104.

Figure 3:
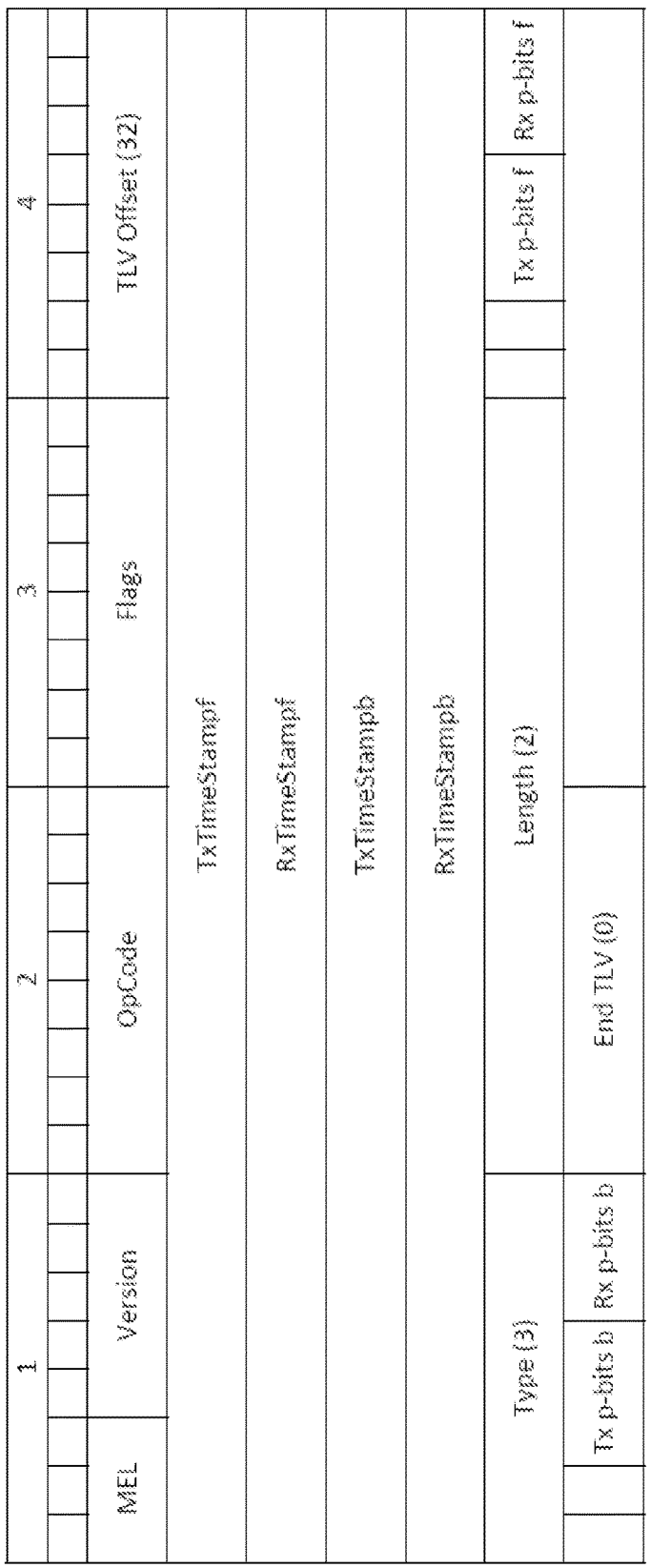
FIG. 3 is an example Delay Measurement Message (DMM)/Delay Measurement Response (DMR) Protocol Data Unit (PDU) format.

FIG. 3 is an example Delay Measurement Message (DMM)/Delay Measurement Response (DMR) Protocol Data Unit (PDU) format 300. In general, the DMM/DMR PDU format 300 depicts the DMM information sent from a source node to a target network node and/or the DMR information transmitted by the target network node responding to the DMM.

In this example, the fields of the DMM/DMR PDU format 300 are as follows:

Maintenance Entity Group (MEG) Level: a 3-bit field that contains an integer value (i.e., 0 to 7) identifying the MEG level of Operation, Administration, and Maintenance (OAM) PDU.

Version: a 5-bit field that contains an integer value identifying the OAM protocol version.

OpCode: value for this PDU type: DMR (46), DMM (47).

Flags: a 1-octet field. Use of the bits in this field is dependent on the OAM PDU type.

TLV Offset: a 1-octet field the value of which is set to 16.

TxTimeStampf: an 8-octet transmit time stamp field that contains a timestamp of DMM transmission at the source node.

RxTimeStampf: an 8-octet transmit time stamp field that contains a timestamp of DMM reception at the target network node.

TxTimeStampb: an 8-octet transmit time stamp field that contains a timestamp of DMR transmission at the target network node.

RxTimeStampb: an 8-octet transmit time stamp field that contains a timestamp of DMR reception at the source node.

Tx p-bits f: a 3-bit field that contains a p-bits value of Ethernet frame in which the DMM PDU is transmitted from the source network node.

Rx p-bits f: a 3-bit field that contains the p-bits value of Ethernet frame carrying the DMM PDU received at the target network node.

Tx p-bits b: a 3-bit field that contains the p-bits value of the Ethernet frame carrying the DMR PDU transmitted by the target node.

Rx p-bits b: a 3-bit field that contains the p-bits value of the Ethernet frame carrying the DMR PDU received at the source node.

End TLV: an all-ZEROes octet value.

Once the source node (i.e., the network node which sends the latency probe) receives the response (e.g., the DMR) to the latency probe, it can calculate the delay measurement for a particular priority classification. For example, a transmission delay from the source node to the target network node for the particular priority classification can be obtained based on a difference between RxTimeStampf and TxTimeStampf. A processing delay for the particular priority classification at the target network node can be obtained based on a difference between TxTimeStampb and RxTime- Stampf. A transmission delay from the target network node to the source node for the particular priority classification can be obtained based on a difference between RxTimeStampb and TxTimeStampb. In addition, p-bits value manipulation between the source node and the target network node can be determined based on Tx p-bits and Rx p-bits. For example, if the Tx p-bits f is different from the Rx p-bits f, p-bits value manipulation between the source node and the target network node can be determined. Similarly, if the Tx p-bits b is different from the Rx p-bits b, p-bits value manipulation between the target node and the source network node can be determined. To identify which network node causes congestion for a particular priority classification or modifies the p-bits value, the intermediate network node between the source node and the target network node may be targeted for subsequent latency probe(s). The delay measurements discussed above can be determined for each different priority classification, and the delay measurements for the different priority classifications can be combined to create the delay profile discussed above.

Figure 4:
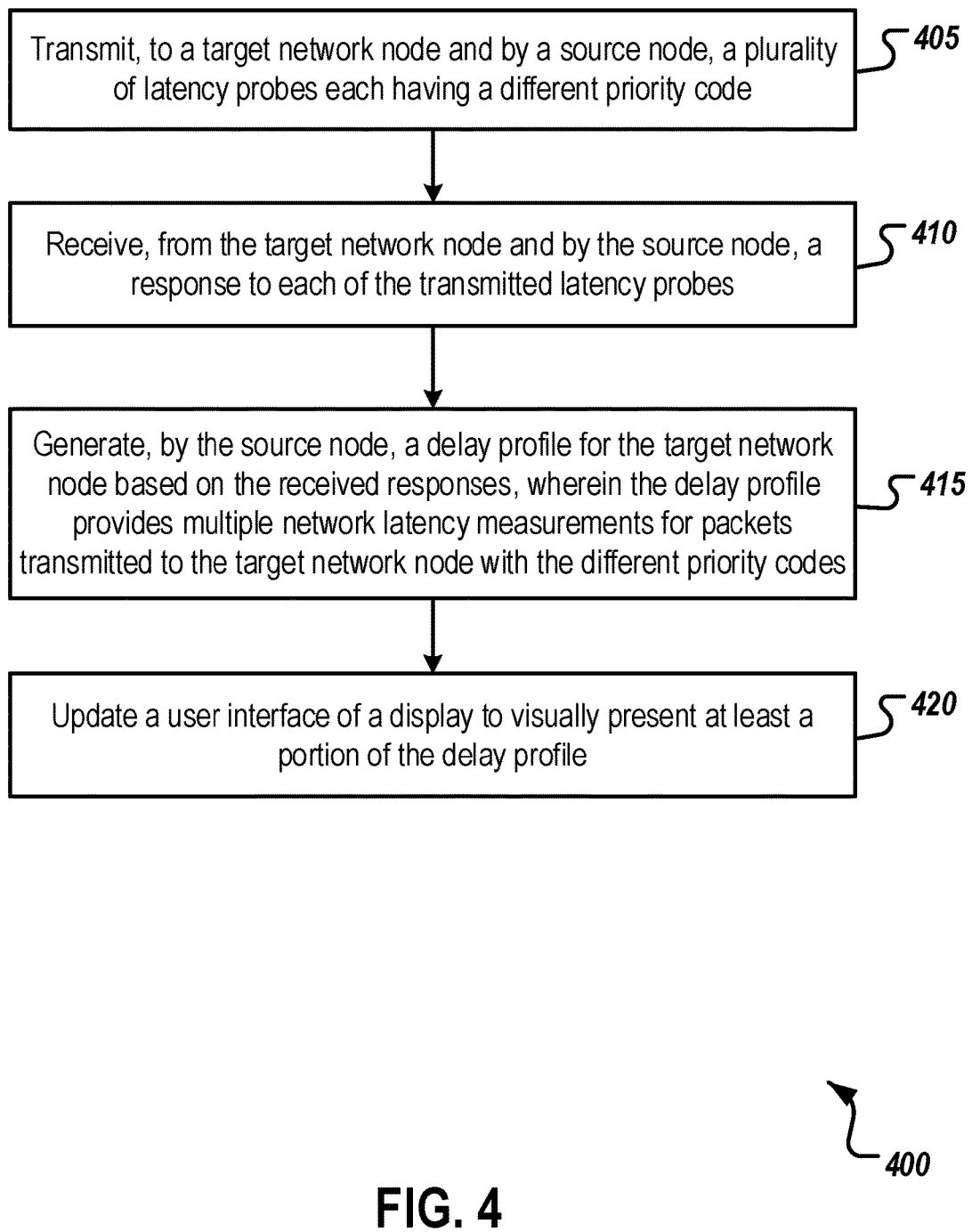
FIG. 4 is a flow chart of an example process for generating a delay profile at different priority classifications.

FIG. 4 is a flow chart of an example process 400 for generating a delay profile at different priority classifications. The example process 400 can be performed, for example, by one or more telecommunications devices, such as those described with reference to FIGS. 1 and 2. The example process 400 can also be implemented as instructions stored on a non-transitory, computer-readable medium that, when executed by one or more telecommunications devices, configures the one or more telecommunications devices to perform and/or cause the one or more telecommunications devices to perform the actions of the example process 400.

Multiple latency probes are transmitted by a source node to a target node (405). Each latency probe has a different priority code. For example, the latency probes can include eight different latency probes, with each of the latency probes having a different one of eight different priority classifications (i.e., eight priority classifications specified by a 3-bit priority code point (p-bits)). In some implementations, fewer than eight latency probes at different priority classifications are transmitted by the source node. The source node can serialize the latency probes and transmit the latency probes one after another. In some implementations, the transmitted latency probes are Y.1731 Delay Measurement Messages (DMMs).

The source node can be a switch or another layer two device. In some implementations, the source node is a telecommunication network device that can generate Ethernet frames. For example, the source node is configured to be able to generate Ethernet frames (e.g., IEEE 802.1q frames). Each Ethernet frame contains a 3-bit priority code point (p-bits), specifying a class of service for the Ethernet frame, in frame header and a DMM in frame payload.

In some implementations, the latency probes are transmitted automatically by the source node at regular intervals. The responses to the latency probes can be stored by the source node for further analysis. For example, the stored responses can be used to generate latency characteristic at different priority classifications over a period of time. In doing so, the source node can monitor network performance between the source node and the target network node at different priority classifications. In some implementations, the latency probes are transmitted to a specific network node when the source node is instructed to do so, for example, by an instruction transmitted to the source node by a network operation center.

A response to each of the transmitted latency probes is received by the source node (410). In some implementations, each received response is an Y.1731 Delay Measurement Response (DMR) generated by the target node and transmitted over the network to the source node. In some implementations, each received response includes a timestamp of when a corresponding latency probe egresses the source node, a timestamp of when the corresponding latency probe ingresses the target network node, a timestamp of when the particular response egresses the target network node, and a timestamp of when the particular response ingresses the source node. The timestamp of when the corresponding latency probe egresses the source node can be obtained from the corresponding latency probe (e.g., the corresponding DMM). In some implementations, each received response includes the priority codes of the given latency probe egressing the source node and ingressing the target node and the priority codes of the response to the given latency probe egressing the target node and ingressing the source node.

Based on the received responses, a delay profile for the target network node is generated (415). The delay profile provides multiple network latency measurements for packets transmitted to the target network node with the different priority codes. In some implementations, the delay profile provides network latency measurements for all priority codes. In some implementations, the delay profile identifies one or more network latency measurements for one or more priority codes that are outside of an acceptable latency range.

A user interface of a display is updated to visually present at least a portion of the delay profile (420). The user interface of the display can help network operators and/or customers (e.g., service subscribers) identify whether service provided at certain priority classification(s) achieve targeted quality of service specified in a Service Level Agreement (SLA). In some implementations, the user interface of the display is updated when the source node is queried, for example, by a network operation center. In some implementations, the user interface of the display is updated at regular intervals.

The example process 400 shown in FIG. 4 can be modified or reconfigured to include additional, fewer, or different actions (not shown in FIG. 4), which can be performed in the order shown or in a different order. For example, after 410, a determination can be made that a priority code transmitted in a particular latency probe (e.g., a DMM) among the plurality of latency probes differs from a priority code received in a response to the particular latency probe (e.g., a corresponding DMR to the DMM). In some implementations, the determination that the priority code received differs from the priority code transmitted can be made, for example, based on the contents of the response. For example, the priority code of the given latency probe and the priority code of the response to the given priority code can be included in the response. When the response is an Y.1731 Delay Measurement Response (DMR), the priority code of the given latency probe and the priority code of the response to the given priority code can be included in the Type, Length, and Value (TLV) fields of the DMR. When the contents of the response are examined, it can be determined that the priority code of the given latency probe and the priority code of the response do not match, thereby indicating that priority code was changed at some point along the communications path. In response to the determination that the priority code received differs from the priority code transmitted, an alert can be generated indicating that the priority code of the given latency probe when transmitted does not match the received priority code of the response to the given latency probe.

In some implementations, based on the received responses to the latency probes, a determination is made that a latency measurement for packets having a given priority code and transmitted to the target network node is outside of an acceptable latency range. In response to the determination that the latency measurement is outside of the acceptable latency range, the following operations can be performed. An intermediate network node can be identified. As discussed above, the intermediate network node is a network node that is in a communications path between the source node and the target network node. When the intermediate node is identified, a subsequent latency probe having the given priority code can be transmitted to (e.g., addressed to) the intermediate network node from the source node. Based on a received response to the subsequent latency probe, a latency measurement for packets transmitted to the intermediate network node with the given priority code can be determined in a manner similar to that discussed above. In some implementations, after the latency measurement for packets transmitted to the intermediate network node with the given priority code is determined, the source node determines how much latency the intermediate network node contributes to the latency measurement for packets transmitted to the target network node with the given priority code. For example, if delay to the target network node with a given priority code is 100 milliseconds and delay to the intermediate network node with the given priority code is 95 milliseconds, the intermediate network node contributes 95% to the delay at the given priority code. If there is a delay problem between the source node and the target network node, the delay problem may lie between the source node and the intermediate network node based on the 95% delay contribution by the intermediate network node. A report can be generated specifying how much latency the intermediate network node contributes to the latency measurement for packets transmitted to the target network node with the given priority code. In some implementations, the network operation center can automatically check suspect node configuration settings which could impact p-bit manipulation.

In some implementations, one or more of the actions shown in FIG. 4 can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action. In some implementations, one or more of the individual actions shown in FIG. 4 may also be omitted from the example process 400.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    transmitting, to a target network node and by a source node, a plurality of latency probes each having a different priority code;
    receiving, from the target network node and by the source node, a response to each of the transmitted latency probes;
    generating, by the source node, a delay profile for the target network node based on the received responses, wherein the delay profile provides multiple network latency measurements for probes transmitted to the target network node with the different priority codes;
    updating a user interface of a display to visually present at least a portion of the delay profile;
    determining, based on the received responses to the latency probes, that a latency measurement for probes having a given priority code and transmitted to the target network node is outside of an acceptable latency range; and
    in response to determining that the latency measurement is outside of the acceptable latency range:
        identifying an intermediate network node that is in a communications path between the source node and the target network node;
        transmitting, to the intermediate network node, a subsequent latency probe having the given priority code; and
        determining a latency measurement for probes transmitted to the intermediate network node with the given priority code based on a response to the subsequent latency probe.

2. The method of claim 1, wherein each received response includes a timestamp of when a corresponding latency probe egresses the source node, a timestamp of when the corresponding latency probe ingresses the target network node, a timestamp of when the particular response egresses the target network node, and a timestamp of when the particular response ingresses the source node.

3. The method of claim 1, wherein transmitting the plurality of latency probes comprises transmitting a plurality of Y.1731 delay measurement messages, each having a different priority code.

4. The method of claim 1, wherein the source node is a switch or another layer two device.

5. The method of claim 1, further comprising determining that a priority code transmitted in a particular latency probe among the plurality of latency probes differs from a priority code received in a response to the particular latency probe.

6. The method of claim 5, further comprising generating an alert that the priority code transmitted in the particular latency probe among the plurality of latency probes differs from the priority code received in the response to the particular latency probe.

7. The method of claim 1, further comprising:
determining how much latency the intermediate network node contributes to the latency measurement for probes having the given priority code and transmitted to the target network node; and
generating a report specifying how much latency the intermediate network node contributes to the latency measurement for probes having the given priority code and transmitted to the target network node.

8. A telecommunications device, comprising:
a communications interface that communicatively couples the telecommunications device with a plurality of network nodes;
a memory structure storing machine executable instructions; and
one or more processors that execute the machine executable instructions and perform operations including:
transmitting, to a target network node, a plurality of latency probes each having a different priority code;
receiving, from the target network node, a response to each of the transmitted latency probes;
generating a delay profile for the target network node based on the received responses, wherein the delay profile provides multiple network latency measurements for probes transmitted to the target network node with the different priority codes;
updating a user interface of a display to visually present at least a portion of the delay profile;
determining, based on the received responses to the latency probes, that a latency measurement for probes having a given priority code and transmitted to the target network node is outside of an acceptable latency range; and
in response to determining that the latency measurement is outside of the acceptable latency range:
identifying an intermediate network node that is in a communications path between the telecommunications device and the target network node;
transmitting, to the intermediate network node, a subsequent latency probe having the given priority code; and
determining a latency measurement for probes transmitted to the intermediate network node with the given priority code based on a response to the subsequent latency probe.

9. The device of claim 8, wherein each received response includes a timestamp of when a corresponding latency probe egresses the telecommunications device, a timestamp of when the corresponding latency probe ingresses the target network node, a timestamp of when the particular response egresses the target network node, and a timestamp of when the particular response ingresses the telecommunications device.

10. The device of claim 8, wherein transmitting the plurality of latency probes comprises transmitting a plurality of Y.1731 delay measurement messages, each having a different priority code.

11. The device of claim 8, wherein the telecommunications device is a switch or another layer two device.

12. The device of claim 8, the operations further including:
determining that a priority code transmitted in a particular latency probe among the plurality of latency probes differs from a priority code received in a response to the particular latency probe.

13. The device of claim 12, the operations further including:
generating an alert that the priority code transmitted in the particular latency probe among the plurality of latency probes differs from the priority code received in the response to the particular latency probe.

14. The device of claim 8, the operations further including:
determining how much latency the intermediate network node contributes to the latency measurement for probes having the given priority code and transmitted to the target network node; and
generating a report specifying how much latency the intermediate network node contributes to the latency measurement for probes having the given priority code and transmitted to the target network node.

15. A system, comprising:
a plurality of network nodes, each network node configured to respond to latency probes; and
a source node configured to:
transmit, to a target network node among the plurality of network nodes, a plurality of latency probes each having a different priority code;
receive, from the target network node, a response to each of the transmitted latency probes;
generate a delay profile for the target network node based on the received responses, wherein the delay profile provides multiple network latency measurements for probes transmitted to the target network node with the different priority codes;
update a user interface of a display to visually present at least a portion of the delay profile;
determine, based on the received responses to the latency probes, that a latency measurement for probes having a given priority code and transmitted to the target network node is outside of an acceptable latency range; and
in response to determining that the latency measurement is outside of the acceptable latency range:
identify an intermediate network node that is in a communications path between the source node and the target network node;
transmit, to the intermediate network node, a subsequent latency probe having the given priority code; and
determine a latency measurement for probes transmitted to the intermediate network node with the given priority code based on a response to the subsequent latency probe.

16. The system of claim 15, wherein each received response includes a timestamp of when a corresponding latency probe egresses the source node, a timestamp of when the corresponding latency probe ingresses the target network node, a timestamp of when the particular response egresses the target network node, and a timestamp of when the particular response ingresses the source node.

17. The system of claim 15, wherein transmitting the plurality of latency probes comprises transmitting a plurality of Y.1731 delay measurement messages, each having a different priority code.

18. The system of claim 15, wherein the source node is a switch or another layer two device.

* * * * *